(12) United States Patent
Kondo et al.

(10) Patent No.: US 7,373,001 B2
(45) Date of Patent: May 13, 2008

(54) COMPRESSED MOVING IMAGE DECOMPRESSION DEVICE AND IMAGE DISPLAY DEVICE USING THE SAME

(75) Inventors: Yoshimasa Kondo, Matsumoto (JP); Tsunenori Kimura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 731 days.

(21) Appl. No.: 10/847,613

(22) Filed: May 18, 2004

(65) Prior Publication Data

US 2005/0031216 A1 Feb. 10, 2005

(30) Foreign Application Priority Data

May 28, 2003 (JP) ............................ 2003-150848

(51) Int. Cl.
  G06K 9/36 (2006.01)
  G06K 9/46 (2006.01)
(52) U.S. Cl. .................... 382/232; 382/351; 348/384.1; 358/426.01
(58) Field of Classification Search ........ 382/232–253; 348/384.1–440.1; 358/426.01–426.16
See application file for complete search history.

(56) References Cited

U.S. PATENT DOCUMENTS

| | | | | |
|---|---|---|---|---|
| 5,990,958 A * | 11/1999 | Bheda et al. | ............ | 348/407.1 |
| 7,151,800 B1 * | 12/2006 | Luna et al. | ............ | 375/240.23 |
| 2002/0136292 A1 * | 9/2002 | Li | ............ | 375/240.01 |
| 2002/0168066 A1 * | 11/2002 | Li | ............ | 380/200 |
| 2003/0016878 A1 * | 1/2003 | Motosu et al. | ............ | 382/251 |
| 2003/0118102 A1 * | 6/2003 | Li et al. | ............ | 375/240.12 |
| 2003/0118113 A1 * | 6/2003 | Comer et al. | ............ | 375/240.25 |
| 2003/0231710 A1 * | 12/2003 | Bolton | ............ | 375/240.2 |
| 2004/0193289 A1 * | 9/2004 | Chen et al. | ............ | 700/3 |
| 2005/0031216 A1 * | 2/2005 | Kondo et al. | ............ | 382/233 |
| 2005/0123037 A1 * | 6/2005 | Kondo et al. | ............ | 375/240.03 |
| 2005/0123048 A1 * | 6/2005 | Kondo et al. | ............ | 375/240.16 |
| 2005/0123049 A1 * | 6/2005 | Kondo et al. | ............ | 375/240.16 |
| 2005/0123050 A1 * | 6/2005 | Kondo et al. | ............ | 375/240.16 |
| 2005/0157937 A1 * | 7/2005 | Kondo et al. | ............ | 382/236 |
| 2005/0249280 A1 * | 11/2005 | Kondo et al. | ............ | 375/240.03 |
| 2005/0254579 A1 * | 11/2005 | Kondo | ............ | 375/240.03 |
| 2006/0143337 A1 * | 6/2006 | Kondo et al. | ............ | 710/58 |

(Continued)

FOREIGN PATENT DOCUMENTS

JP 06-164413 A 6/1994

(Continued)

OTHER PUBLICATIONS

U.S. Appl. No. 10/847,612, filed May 18, 2004, Kondo et al.

(Continued)

*Primary Examiner*—Aaron W Carter
(74) *Attorney, Agent, or Firm*—Oliff & Berridge, PLC

(57) ABSTRACT

A moving image compression (or encoding) device including: a hardware processing section which compresses moving image data by hardware; a data storage section which stores the moving image data processed by the hardware processing section; and a software processing section which compresses the moving image data from the data storage section by software. The hardware processing section includes a plurality of processing sections which perform processing including a discrete cosine transform and quantization of the moving image data. The software processing section performs variable-length coding of the quantized moving image data.

11 Claims, 12 Drawing Sheets

U.S. PATENT DOCUMENTS

2006/0143615 A1* 6/2006 Kondo et al. ............... 718/100
2007/0052842 A1* 3/2007 Luna et al. .............. 348/395.1

FOREIGN PATENT DOCUMENTS

| JP | 07-222163 A | 8/1995 |
|---|---|---|
| JP | 08-205175 A | 8/1996 |
| JP | 09-084004 A | 3/1997 |
| JP | 09-247673 A | 9/1997 |
| JP | 10-098731 A | 4/1998 |
| JP | 11-136677 A | 5/1999 |
| JP | 2002-159006 A | 5/2002 |

OTHER PUBLICATIONS

Xun et al., "Multimedia Video Terminal Based on Combination of Software and Hardware," Journal of Image and Graphics of China, vol. 6(A), No. 6, pp. 509-603, Jun. 2001.

* cited by examiner

FIG. 4

DCT COEFFICIENT

FREQUENCY IS HIGHER →

FREQUENCY IS HIGHER ↓

| 224 | 130 | 40  | 16  | 11 | 8  | -2 | -1 |
|-----|-----|-----|-----|----|----|----|----|
| 41  | -34 | -14 | -10 | -4 | 0  | -1 | 3  |
| -7  | 10  | -12 | 2   | 2  | -5 | 1  | -1 |
| 22  | -7  | 9   | 2   | 0  | 0  | -3 | 2  |
| -8  | 4   | -6  | 3   | -1 | -2 | 4  | -1 |
| 5   | 2   | -1  | -4  | 0  | 1  | -1 | -1 |
| 4   | -5  | 3   | -1  | 0  | 2  | 0  | -1 |
| -5  | 5   | -2  | 3   | 0  | -2 | 1  | -1 |

FIG. 5

QUANTIZATION TABLE

| 8 | 6 | 5 | 8 | 12 | 20 | 26 | 30 |
|---|---|---|---|----|----|----|----|
| 6 | 6 | 7 | 10 | 13 | 29 | 30 | 28 |
| 7 | 7 | 8 | 12 | 20 | 29 | 35 | 28 |
| 7 | 9 | 11 | 15 | 26 | 44 | 40 | 31 |
| 9 | 11 | 19 | 28 | 34 | 55 | 52 | 39 |
| 12 | 18 | 28 | 32 | 41 | 52 | 57 | 46 |
| 25 | 32 | 39 | 44 | 52 | 61 | 60 | 51 |
| 36 | 46 | 48 | 49 | 56 | 50 | 52 | 50 |

FIG. 6

QUANTIZED DCT COEFFICIENTS (QF DATA)

| 28 | 22 | 8 | 2 | 1 | 0 | 0 | 0 |
|----|----|---|---|---|---|---|---|
| 7 | -6 | -2 | -1 | 0 | 0 | 0 | 0 |
| -1 | 1 | -2 | 0 | 0 | 0 | 0 | 0 |
| 3 | -1 | 1 | 0 | 0 | 0 | 0 | 0 |
| -1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

ZERO COUNT DATA PACKET

7-BIT COMPRESSED DATA PACKET

UNCOMPRESSED DATA PACKET

FIG. 11

QF DATA IN ONE BLOCK (HEXADECIMAL)

| 025 | 001 | 000 | 000 | 000 | 000 | 000 | 000 |
|-----|-----|-----|-----|-----|-----|-----|-----|
| 02F | 003 | 000 | FFC | FFF | 000 | 000 | 000 |
| 04B | FFB | FFF | 000 | 001 | 000 | 000 | 000 |
| 04F | FF7 | FFA | FFD | FFF | 000 | 000 | 000 |
| 032 | FF9 | 000 | FFE | 000 | 000 | FFC | 000 |
| 026 | 002 | 001 | FFE | FFF | 000 | 000 | 000 |
| 029 | FFB | 000 | 000 | 000 | 000 | 000 | 000 |
| 000 | 000 | 000 | 000 | 000 | 000 | 000 | 000 |

|0|0 0 0 0 0 0 1|0 0 1 0 0 1 0 1| ← 7-BIT COMPRESSED DATA PACKET
         =              =
        001           025

|1|0|0|1|0 0 0 0 0 0 0 1 1 0| ← ZERO COUNT DATA PACKET
            =
SIX ZERO DATA ITEMS ARE
CONTINUOUSLY ARRANGED

|0|0 0 0 0 0 1 1|0 1 0 1 1 1 1| ← 7-BIT COMPRESSED DATA PACKET
         =             =
     003          02F

|1|0|0|1|0 0 0 0 0 0 0 0 0 1| ← ZERO COUNT DATA PACKET
            =
THERE IS ONE ZERO DATA ITEM

|1|0|0|0|0 1 1 1 1 1 1 1 1 0 0| ← UNCOMPRESSED DATA PACKET
            =
         FFC

|1|0|0|0|0 1 1 1 1 1 1 1 1 1 1| ← UNCOMPRESSED DATA PACKET
            =
         FFF

|1|0|0|1|0 0 0 0 0 0 0 0 1 1| ← ZERO COUNT DATA PACKET
            =
THREE ZERO DATA ITEMS ARE
CONTINUOUSLY ARRANGED

COMPRESSED MOVING IMAGE DECOMPRESSION DEVICE AND IMAGE DISPLAY DEVICE USING THE SAME

Japanese Patent Application No. 2003-150848, filed on May 28, 2003, is hereby incorporated by reference in its entirety.

BACKGROUND OF THE INVENTION

The present invention relates to a decompression device which decompresses a moving image compressed by Moving Picture Experts Group (MPEG) technology or the like, and an image display device using the same.

In a conventional MPEG-4 compression (encode)/decompression (decode) device, the entire encode/decode processing is performed by hardware.

In the case where the entire encode/decode processing is performed by hardware, since the circuit scale is inevitably increased, reduction of the IC size is hindered. This makes it impossible to satisfy a demand for reduction of the size of a portable instrument such as a portable telephone.

In the case where the entire encode/decode processing is performed by software, the load imposed on the CPU increases. Therefore, the time necessary for the CPU to perform other processing is limited, whereby the performance of the instrument cannot be realized. Moreover, power consumption is increased due to an increase in operation time of the CPU. Therefore, a demand for reduction of power consumption of a portable instrument such as a portable telephone in order to maintain battery life cannot be satisfied.

BRIEF SUMMARY OF THE INVENTION

Accordingly, the present invention may provide a compressed moving image decompression device in which decompression processing of a compressed moving image is shared between hardware and software and in which different roles are assigned to hardware and software depending on superiority of hardware and software, and an image display device using the same.

The present invention may also provide a compressed moving image decompression device in which decompression processing of a compressed moving image can be performed by hardware and software in parallel and in which the buffer capacity necessary for the processing can be reduced, and an image display device using the same.

A compressed moving image decompression device according to one aspect of the present invention includes:

a software processing section which decompresses compressed moving image data by software;

a data storage section which stores the moving image data that has been processed by the software processing section; and a hardware processing section which decompresses the moving image data from the data storage section by hardware, wherein the software processing section performs decode processing of a variable length code of the compressed moving image data that has been variable-length coded, and the hardware processing section includes a plurality of processing sections which perform inverse quantization and subsequent processing of the moving image data that has been decompressed by the software processing section.

Since zero data accounts for the majority of moving image data before inverse quantization, the amount and types of information are significantly small in comparison with data after inverse quantization. Moreover, the operation load of decode processing of the variable length code is small. Therefore, even if the processing with small amount of information and reduced operation load is processed by the software processing section, the processing load is small. On the contrary, the amount of information is large and the operation is complicated in most processing after the inverse quantization. Therefore, the processing load is too heavy for software processing. Although the above processing is heavy load processing, the processing rarely has to be changed, since a format of processing is determined in advance. Moreover, the processing is mainly repetition processing, and this processing is suitable for hardware processing. Furthermore, since the amount of data processed in the software processing section is small, the amount of data transmitted to the hardware processing section from the software processing section is small, whereby the transmission load is reduced. Since the data storage section which functions as a buffer is provided between the software processing section and the hardware processing section, the software processing and the hardware processing can be performed in parallel. In addition, reduction of the device size and reduction of power consumption can be realized by using the software processing and the hardware processing.

With this compressed moving image decompression device, the software processing section may include a data compression section which compresses the moving image data to be stored in the data storage section. The hardware processing section may include a data decompression section which decompresses the moving image data from the data storage section.

This enables the capacity of the data storage section to be reduced, whereby the size of the device can be reduced.

With this compressed moving image decompression device, the data compression section may count the number of zero data items continuously arranged on at least one pixel line and may compress the zero data items into a zero data count value.

Since high-frequency alternating-current components contain large number of zero data items in the moving image data before inverse quantization, the moving image data can be efficiently compressed.

With this compressed moving image decompression device, the data storage section may include a plurality of types of packets, each of the packets storing the moving image data of a given number of bits, and each of the types of the packets being identified by a higher-order bit of the moving image data. The data compression section may use the packets depending on whether the packets store compression data or uncompression data.

With this compressed moving image decompression device, one of the packets may be a zero count data packet. The data compression section may store the zero data count value into the zero count data packet.

With this compressed moving image decompression device, another of the packets may be a compressed data packet. The data compression section may store a plurality of items of the moving image data into the same compression data packet for compressing the moving image data, each of the items of the moving image data being represented by one or more bits, and the number of bits of the moving image data being equal to or less than a predetermined number.

With this compressed moving image decompression device, still another one of the packets may be an uncompressed data packet. The data compression section may store the moving image data into the uncompressed data packet, the moving image data being represented by one or more bits, and the number of bits of the moving image data being greater than the predetermined number.

Since amount of the moving image data stored in the uncompressed data packet is comparatively limited before inverse quantization, the degree of compression rarely decreases.

With this compressed moving image decompression device, the data storage section may include a first storage region which stores the moving image data for at least one frame.

With this compressed moving image decompression device, the compressed moving image data that is input to the software processing section may be discrete cosine transformed in units of one block that is formed of 8×8 pixels. The first storage region may include a plurality of second storage regions, each of the second storage regions storing the plurality of types of packets and storing the moving image data for the one block.

With this compressed moving image decompression device, a control data packet which stores control data generated by the software processing section may be provided in each of the second storage regions.

The control data is used for the decompression processing in the hardware processing section.

With this compressed moving image decompression device, the data storage section may further include a display storage region which stores the moving image data for at least one frame that has been decompressed by the hardware processing section.

The data storage section may include a display storage region for the moving image data for at least two frames. In this case, a moving image can be displayed more smoothly.

With this compressed moving image decompression device, the software processing section may perform reverse scan processing after the decode processing of the variable length code.

With this compressed moving image decompression device, the software processing section may perform inverse AC/DC (alternating current/direct current component) prediction after the reverse scan processing.

An image display device according to another aspect of the present invention includes: a host CPU; a first integrated circuit which is connected with the host CPU and includes a software processing section which decompresses compressed moving image data by software; a second integrated circuit which is connected with the host CPU and performs display control; and an image display section which is controlled by the second integrated circuit. The second integrated circuit includes: a data storage section which stores the moving image data that has been processed by the software processing section; and a hardware processing section which decompresses the moving image data from the data storage section by hardware. The software processing section performs decode processing of a variable length code of the compressed moving image data that has been variable-length coded, and the hardware processing section includes a plurality of processing sections which perform inverse quantization and subsequent processing of the moving image data that has been decompressed by the software processing section.

The effects of the decompression device can be achieved by providing the decompression device in the image display device. Moreover, since the amount of information transmitted between the host CPU and the first or second integrated circuit is small, the period of time in which the host CPU is exclusively used for data transmission can be reduced.

BRIEF DESCRIPTION OF THE SEVERAL VIEWS OF THE DRAWING

FIG. 4 shows an example of DCT coefficients obtained by a discrete cosine transform (DCT).

FIG. 5 shows an example of a quantization table used in quantization.

FIG. 6 shows quantized DCT coefficients (QF data) obtained by dividing the DCT coefficients shown in FIG. 4 by numerical values in the quantization table shown in FIG. 5.

FIG. 11 is illustrative of an operation of storing QF data in one block in various data packets.

DETAILED DESCRIPTION OF THE EMBODIMENT

An embodiment of the present invention is described below with reference to the drawings.

Outline of Portable Telephone

Figure 1:
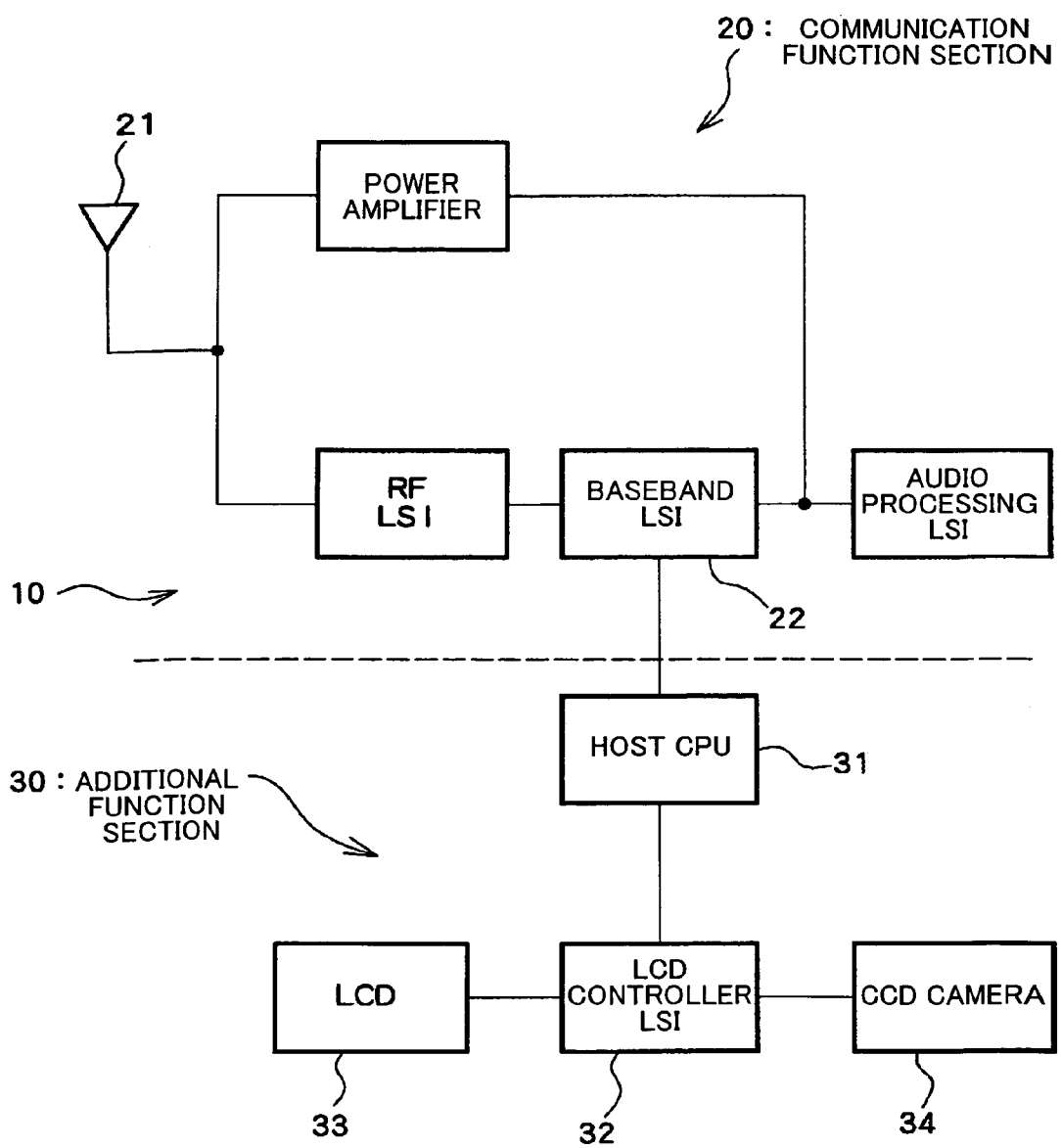
FIG. 1 is a schematic block diagram of a portable telephone which is an example of an electronic instrument to which the present invention is applied.
Figure 2A:
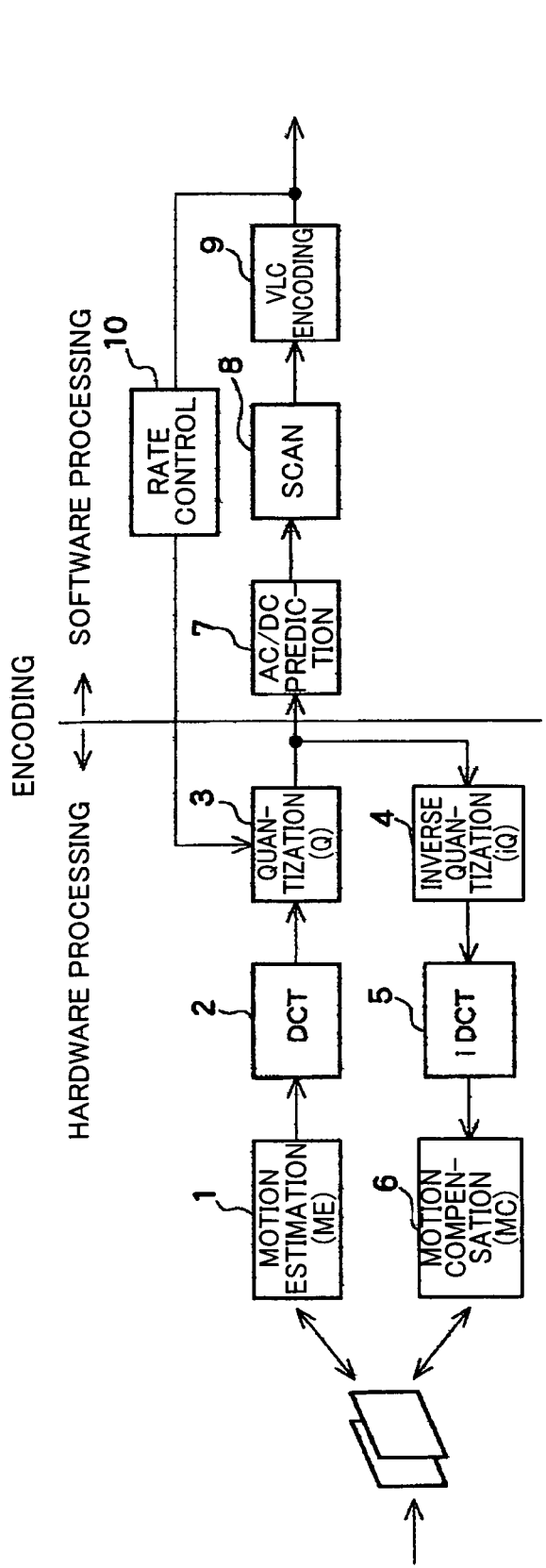
FIG. 2A is a flowchart showing a processing procedure in an MPEG encoder.
Figure 2B:
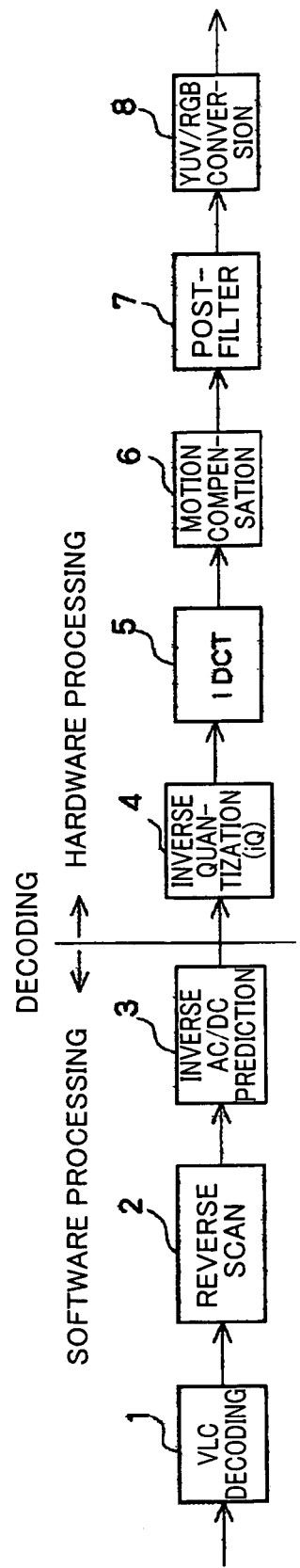
FIG. 2B is a flowchart showing a processing procedure in an MPEG decoder.

FIG. 1 is a block diagram of a portable telephone which is an example of an electronic instrument to which the present invention is applied. In FIG. 1, a portable telephone 10 is roughly divided into a communication function section 20 and an additional function section 30. The communication function section 20 includes various conventional blocks which process a signal (including a compressed moving image) transmitted and received through an antenna 21. A baseband LSI 22 (first processing circuit) in the communication function section 20 is a processor which mainly processes voice or the like, and is necessarily provided in the portable telephone 10. The baseband LSI 22 is provided with a baseband engine (BBE), an application processor, and the like. Variable length code (VLC) encoding, scanning, AC/DC (alternating current/direct current component) prediction, and rate control of MPEG-4 compression (encode) processing shown in FIG. 2A are performed by software on the processor. Variable length code (VLC) decoding, reverse scanning, and AC/DC (alternating current/direct current component) prediction of MPEG-4 decompression (decode) processing shown in FIG. 2B are performed by software on the processor provided in the baseband LSI 22. The remaining MPEG-4 decode and encode processing is performed by hardware provided in the additional function section 30.

The additional function section 30 includes a host central processing unit (CPU) 31 connected with the baseband LS 22 in the communication function section 20. An LCD controller LSI 32 (second integrated circuit) is connected with the host CPU 31. A liquid crystal display device (LCD) 33 as an image display section and a CCD camera 34 as an imaging section are connected with the LCD controller LSI 32. The hardware processing of MPEG-4 decoding and encoding is performed by hardware provided in the LCD controller LSI 32.

MPEG-4 Encoding and Decoding

The MPEG-4 encode and decode processing shown in FIGS. 2A and 2B is briefly described below. The details of the processing are described in "JPEG & MPEG: Illustrated Image Compression Technology", Hiroshi Ochi and Hideo Kuroda, Nippon Jitsugyo Publishing Co., Ltd., for example. In the following description, only the processing relating to the present invention is mainly described.

In the compression (encode) processing shown in FIG. 2A, motion estimation (ME) between two successive images is performed (Step 1). In more detail, the difference between two images is calculated for a single pixel. Since the difference between the two images is zero in the still image region, the amount of information can be reduced. The zero data in the still image region and the difference (positive and negative component) in the moving image region make up information after the motion estimation.

Figure 3:
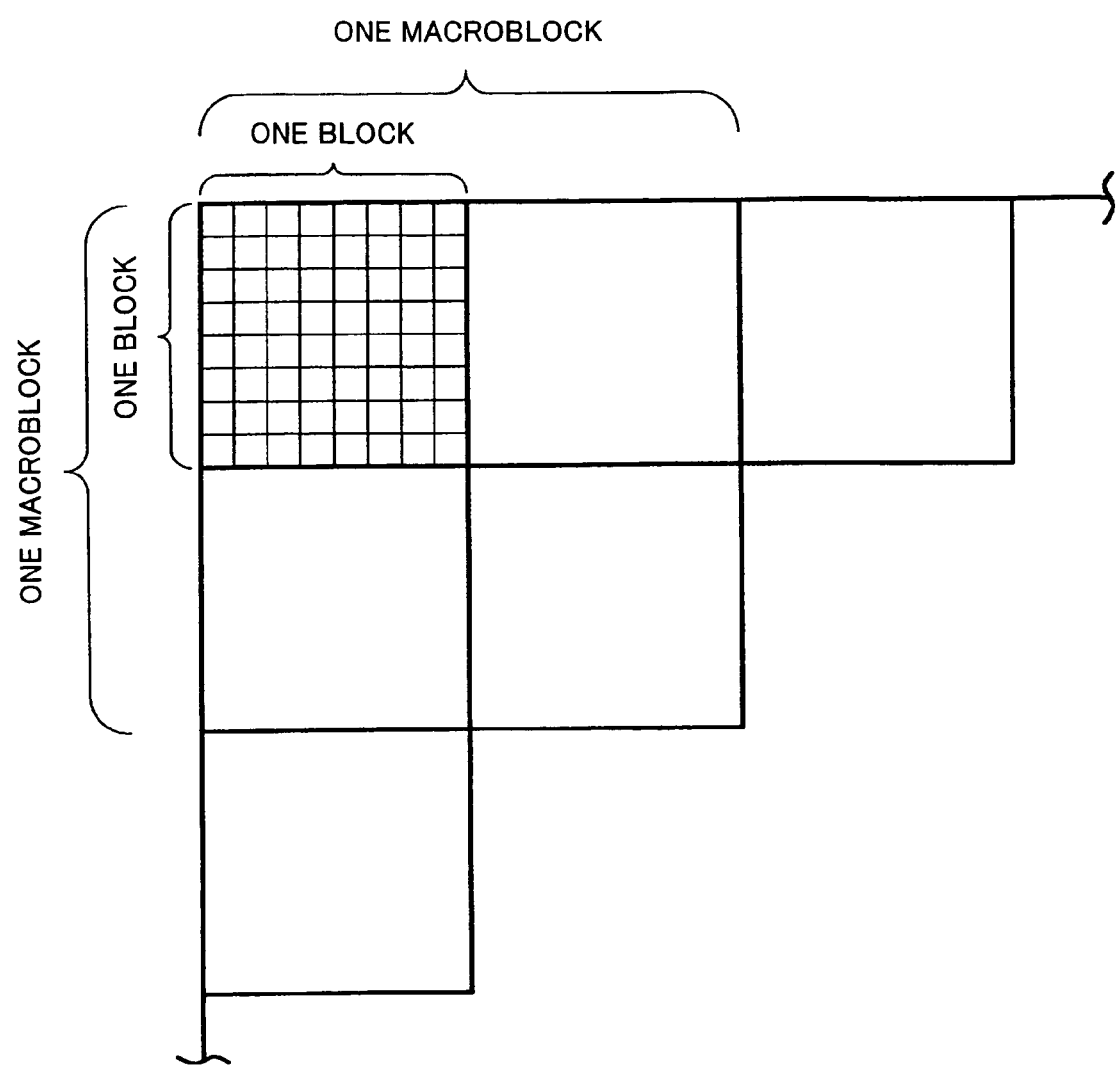
FIG. 3 shows a block and a macroblock which are processing units in an MPEG encoder and an MPEG decoder.

A discrete cosine transform (DCT) is then performed (Step 2). The discrete cosine transform is performed in units of 8×8 pixel blocks shown in FIG. 3 to calculate DCT coefficients in units of blocks. The DCT coefficients after the discrete cosine transform represent changes in light and shade of an image in one block by average brightness (DC component) and spatial frequency (AC component). FIG. 4 shows an example of the DCT coefficients in one 8×8 pixel block (quotation from FIGS. 5-6 on page 116 in the above reference document). The DCT coefficient on the upper left corner represents a DC component, and the remaining DCT coefficients represent AC components. The influence on image recognition is small even if high-frequency AC components are omitted.

The DCT coefficients are then quantized (Step 3). The quantization is performed in order to reduce the amount of information by dividing the DCT coefficients in one block by quantization step values at corresponding positions in a quantization table. FIG. 6 shows the DCT coefficients in one block obtained by quantizing the DCT coefficients shown in FIG. 4 using a quantization table shown in FIG. 5 (quotation from FIGS. 5-9 and 5-10 on page 117 in the above reference document). As shown in FIG. 6, most of the DCT coefficients become zero data after dividing the DCT coefficients of high frequency components by the quantization step values and rounding off to the nearest whole number, whereby the amount of information is significantly reduced.

A feed-back route is necessary for the encode processing in order to perform the motion estimation (ME) between the currently processed frame and the subsequent frame. As shown in FIG. 2A, inverse quantization (iQ), inverse DCT, and motion compensation (MC) are performed through the feed-back route (Steps 4 to 6). The detailed operation of motion compensation is omitted. This processing is performed in units of 16×16 pixel macroblocks shown in FIG. 3.

The series of processing in Steps 1 to 6 is performed by the hardware provided in the LCD controller LSI 32 of this embodiment.

AC/DC prediction, scanning, VLC encoding, and rate control performed by the software on the processor provided in the baseband LSI 22 shown in FIG. 1 are described below.

AC/DC prediction performed in Step 7 and scanning performed in Step 8 shown in FIG. 2A are processing necessary for VLC encoding in Step 9. In VLC encoding in Step 9, the difference in the DC component between adjacent blocks is encoded, and the order of encoding is determined by scanning the AC components in the block from the low frequency side to the high frequency side (also called "zigzag scan").

VLC encoding in Step 9 is also called entropy encoding, and has an encoding principle in which a component with higher emergence frequency is represented by using a smaller number of codes. The difference between adjacent blocks is encoded for the DC component, and the DCT coefficients are sequentially encoded for the AC components from the lower frequency side to the higher frequency side in the order of scanning by utilizing the results obtained in Steps 7 and 8.

The amount of information generated by image signals changes depending on the complexity of the image and intensity of motion. In order to transmit the information at a constant transmission rate by absorbing the change, it is necessary to control the number of codes to be generated. This is achieved by rate control in Step 10. A buffer memory is generally provided for rate control. The amount of information to be stored is monitored so that the buffer memory does not overflow, and the amount of information to be generated is reduced before the buffer memory overflows. In more detail, the number of bits which represent the DCT coefficient is reduced by roughening the quantization characteristics in Step 3.

FIG. 2B shows decompression (decode) processing of the compressed moving image. The decode processing is achieved by inversely performing the encode processing shown in FIG. 2A in the reverse order. A "postfilter" shown in FIG. 2B is a filter for eliminating block noise. In the decode processing, VLC decoding (step 1), inverse scan (step 2), and inverse AC/DC prediction (step 3) are processed by the software, and processing after inverse quantization is processed by the hardware (steps 4-8).

Configuration and Operation of LCD Controller LSI

Figure 7:
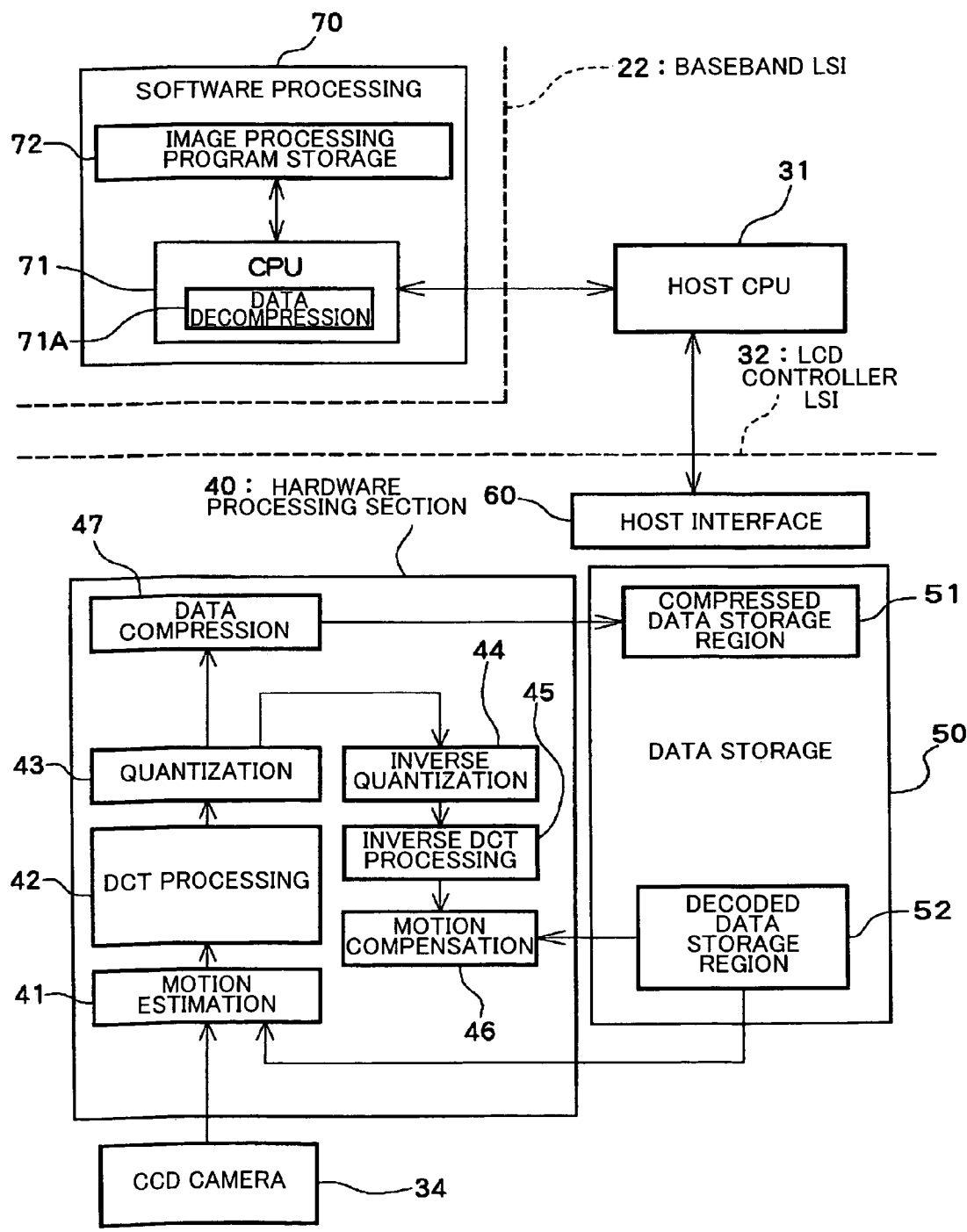
FIG. 7 is a block diagram illustrating a configuration relating to an MPEG decoder among the sections shown in FIG. 1.

FIG. 7 is a functional block diagram of the LCD controller LSI 32 shown in FIG. 1. FIG. 7 shows hardware relating to a decode processing section of a compressed moving image. The LCD controller LSI 32 includes a hardware processing section 40 which performs Steps 4 to 8 shown in FIG. 2B, and a data storage section 50. The LCD controller LSI 32 is connected with the host CPU 31 through a host interface 60. A software processing section 70 is provided in the baseband LSI 22. The software processing section 70 performs Steps 1 to 3 shown in FIG. 2B. The software processing section 70 is connected with the host CPU 31.

The software processing section 70 is described below. The software processing section 70 includes a CPU 71 and an image processing program storage section 72 as hardware. The CPU 71 performs Steps 1 to 3 shown in FIG. 2B on a compressed moving image input through the antenna 21 shown in FIG. 1 according to an image processing program stored in the storage section 72. The CPU 71 also functions as a data compression section 71A which compresses the data processed in Step 3 shown in FIG. 2B. The compressed data is stored in a compressed data storage region 51 provided in the data storage section 50 (SRAM, for example) in the LCD controller 32 through the host CPU 31 and the host interface 60.

The hardware processing section 40 provided in the LCD controller 32 includes a data decompression section 41 which decompresses the compressed data from the compressed data storage region 51. The hardware processing section 40 includes processing sections 42 to 45 for performing the processing in Steps 4 to 7 shown in FIG. 2B. The moving image data from which block noise is eliminated by using the postfilter 45 is stored in a display storage region 52 in the data storage section 50. A color information conversion processing section 46 performs YUV/RGB conversion in Step 8 shown in FIG. 2B based on image information stored in the display storage region 52. The output from the processing section 46 is supplied to the LCD 33 through an LCD interface 47, and used to drive the display. The display storage region 52 has the capacity for storing a moving image for at least one frame. The display storage region 52 preferably has the capacity for storing a moving image for two frames so that the moving image can be displayed more smoothly.

In this embodiment, Steps 1 to 3 shown in FIG. 2B are processed by the software and Steps 4 to 8 are processed by the hardware for the following reasons. Before inverse quantization in Step 4 shown in FIG. 2B is performed, zero data accounts for the majority of each block as shown in FIG. 6. Therefore, the amount and types of information is significantly small in comparison with the data after inverse quantization (FIG. 4). Moreover, since the load of operation in Steps 1 to 3 is small, the processing load is small even if Steps 1 to 3 are processed by the software. On the contrary, in inverse quantization in Step 4 and inverse DCT in Step 5 shown in FIG. 2B, the amount of information is great and the operation is complicated. Therefore, the processing load is heavy for the software processing. Although inverse quantization, inverse DCT, and motion compensation are heavy load processing steps, the necessity of changing the processing is small since the processing is determined in advance. Moreover, the processing is mainly repetition processing. Therefore, these processing steps are suitable for hardware processing. Since the amount of data processed by the software is small before inverse quantization, the amount of data transmitted from the software processing section 70 to the hardware processing section 40 through the host CPU 31 is small. Therefore, the load imposed on the host CPU 31 is reduced.

Figure 8:
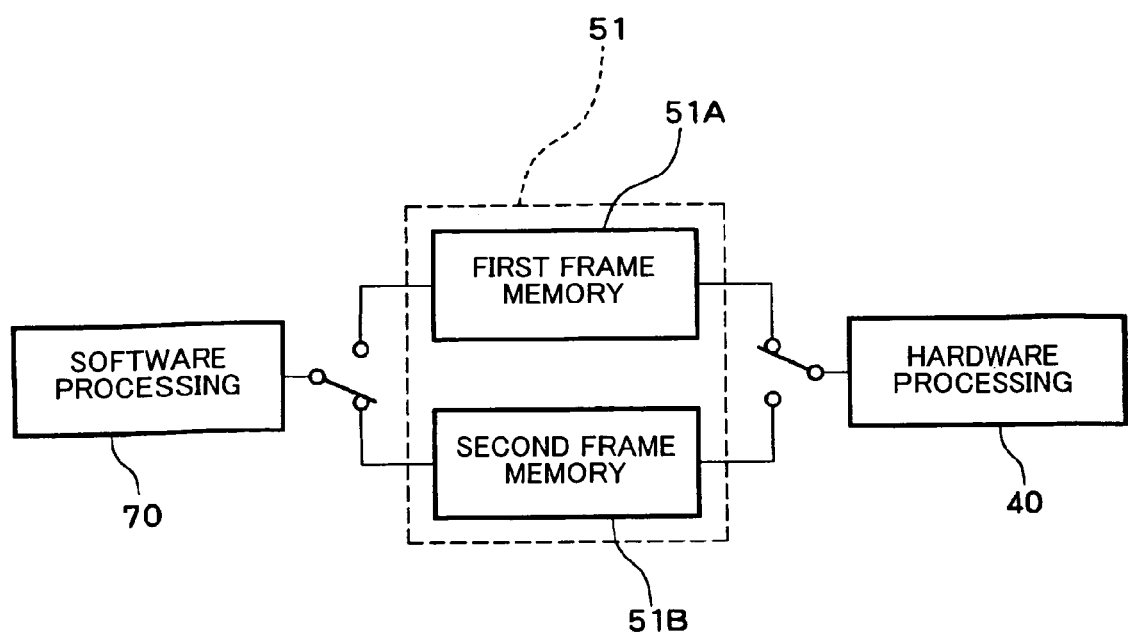
FIG. 8 is illustrative of an example of a buffer provided between a software processing section and a hardware processing section.

The compressed data storage region provided between the software processing section 70 and the hardware processing section 40 is described below. In the processing in the software processing section 70, the amount of information changes depending on the complexity of the moving image and intensity of motion, and the processing time changes depending on the amount of information. On the other hand, the processing time in the hardware processing section 40 changes only to a small extent. In order to efficiently drive the software processing section 70 and the hardware processing section 40 in parallel, it is necessary to provide the compressed data storage region which functions as a buffer between the software processing section 70 and the hardware processing section 40. The buffer is necessary for at least one frame. As shown in FIG. 8, first and second frame memories 51A and 51B may be provided, for example. This prevents the hardware processing section 40 from being restricted by the processing time in the software processing section 70.

In this embodiment, data obtained by compressing the data processed by the software in Steps 1 to 3 shown in FIG. 2B (hereinafter called "QF data") by using the data compression section 71A shown in FIG. 7 is stored in the compressed data storage region. Therefore, the amount of information transmitted from the software processing section 70 to the compressed data storage region through the host CPU 31 is further reduced, whereby the time in which the host CPU 31 is exclusively used for data transmission is reduced.

Figure 9:
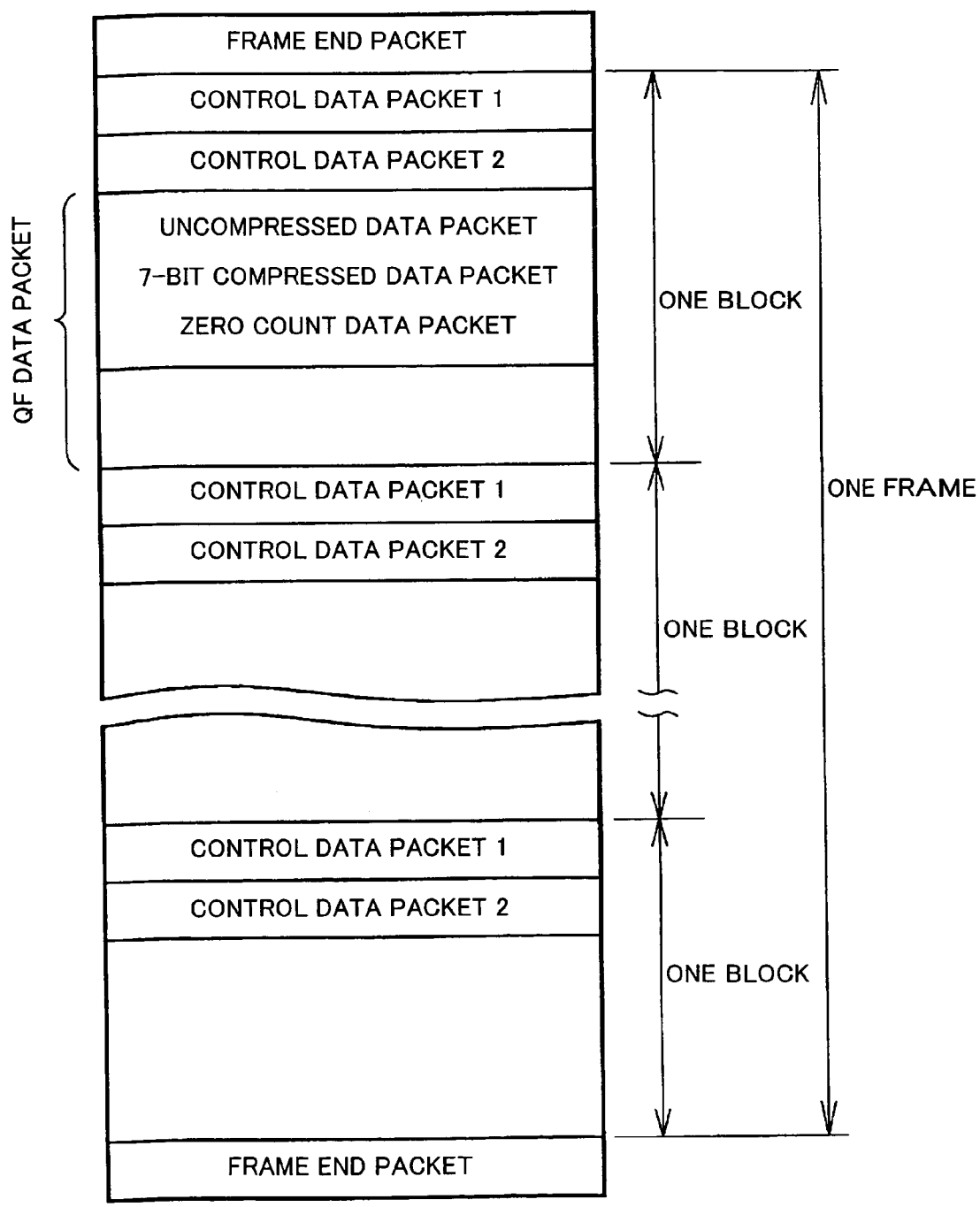
FIG. 9 is illustrative of information for one frame stored in a buffer.
Figure 10A:
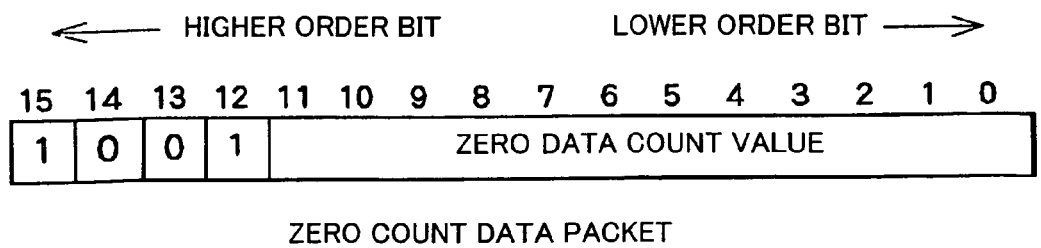
FIGS. 10A to 10C are illustrative of types of QF data packets shown in FIG. 9.
Figure 10B:
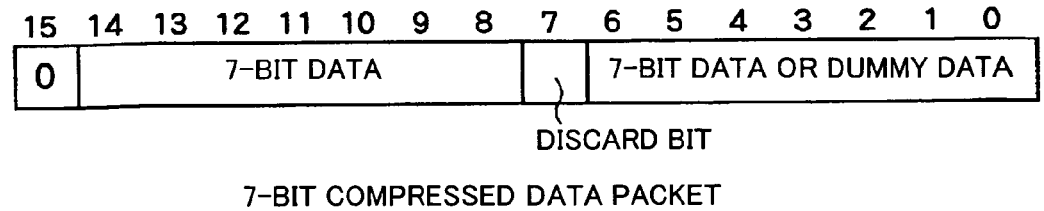
Figure 10C:
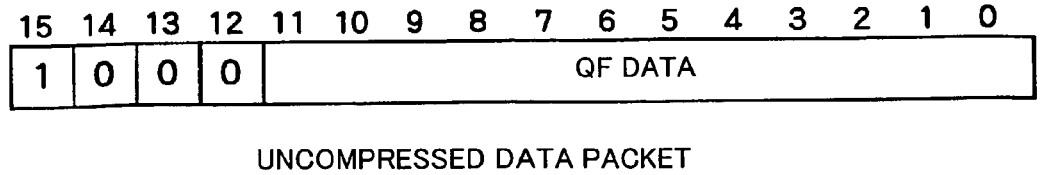

Data Compression in Software Processing Section and Data Decompression in Hardware Processing Section The data compression operation in the data compression section 71A shown in FIG. 7 is described below. FIG. 9 shows a storage region for one frame in the compressed data storage region shown in FIG. 7. The storage region for one frame is disposed between frame end packets, and divided in units of blocks shown in FIG. 3. Each block is made up of control data packets 1 and 2 and a number of QF data packets. The control data packets 1 and 2 store control data which is generated by the processing in Steps 1 to 3 shown in FIG. 2B and is necessary for the decode processing in the hardware processing section 40.

The QF data processed in Steps 1 to 3 shown in FIG. 2B is compressed. The QF data is compressed and stored in a QF data packet shown in FIG. 9. The QF data packets are made up of a zero count packet, a 7-bit compressed data packet, and an uncompressed data packet shown in FIGS. 10A to 10C, for example.

The frame end packet, the control data packet, and the QF data packet shown in FIG. 9 have a 16-bit data length, for example. In the zero count packet shown in FIG. 10A, identification data "1001" which indicates the zero count packet is stored in higher-order four bits, and a zero count value is stored in the remaining 12 bits. In the 7-bit compressed data packet shown in FIG. 10B, identification data "0" which indicates the 7-bit compressed data packet is stored in a higher-order one bit field, and 7-bit compressed data is stored in the subsequent seven bit fields. The subsequent bit field (eighth bit) is a discard bit sign field. If 7-bit data stored in the lower-order seven bits is effective compressed data, "0" is stored in the discard bit field. If 7-bit data stored in the lower-order seven bit fields is dummy data, "1" is stored in the discard bit field. If the QF data is seven bits or less, two items of QF data are compressed and stored in one 7-bit compressed data packet. In the uncompressed data packet shown in FIG. 10C, identification data "1000" which indicates the uncompressed data packet is stored in higher-order four bit fields, and uncompressed data is stored in the subsequent 12 bit fields. A bit which indicates a positive or negative sign is assigned to the most significant bit of each of the 7-bit compressed data and the 12-bit uncompressed data.

FIG. 11 shows a state in which the QF data is stored in each packet. FIG. 11 shows a state in which the QF data in one block shown in FIG. 3, which is indicated in three hexadecimal digits (positive or negative sign is omitted), is compressed in three types of packets shown in FIGS. 10A to 10C (only compression of data in the upper two lines in one block is illustrated). A to F in FIG. 11 respectively correspond to numerical values of 10 to 15. For example, the maximum value FFF in three hexadecimal digits means "$15 \times 16^2 + 15 \times 16^1 + 15 \times 16^0 = 4095$".

In this case, "025" in hexadecimal notation at the start address of one block corresponds to "37" in decimal notation. This value can be expressed by seven bits "0100101" in binary notation (most significant (sign) bit is set to "0"; hereinafter the same). Therefore, this data is stored in the lower-order seven bit fields of the 7-bit compressed data packet. "001" in hexadecimal notation at the next address corresponds to "1" in decimal notation. This value can be expressed by seven bits "0000001" in binary notation. Therefore, this data is stored in the higher-order seven bit fields of the 7-bit compressed data packet. Six zero data items represented by "000" are continuously arranged from the next address. Therefore, "110" which indicates the number "6" of continuous zeros in binary notation is stored in the lower-order three bits of the zero count data packet. "02F" and "003" in hexadecimal notation in the second line respectively correspond to "47" and "3" in decimal notation. Since these values can be expressed by seven bits or less in binary notation, these values are stored in the 7-bit compressed data packet as shown in FIG. 11. Since only one zero data item represented by "000" exists at the next address, the zero count value is stored in the zero count data packet. "FFC" and "FFF" in hexadecimal notation at the subsequent addresses respectively correspond to "4092" and "4095" in decimal notation. These values cannot be expressed by data of seven bits or less in binary notation. Therefore, "FFC" and "FFF" are stored in the uncompressed data packets. Three zero data items represented by "000" arranged continuously from the next address. Therefore, "11" Which indicates the number "3" of continuous zeros in binary notation is stored in the lower-order two bits of the zero count data packet. The remaining QF data is compressed in the same manner as describe above.

Figure 12:
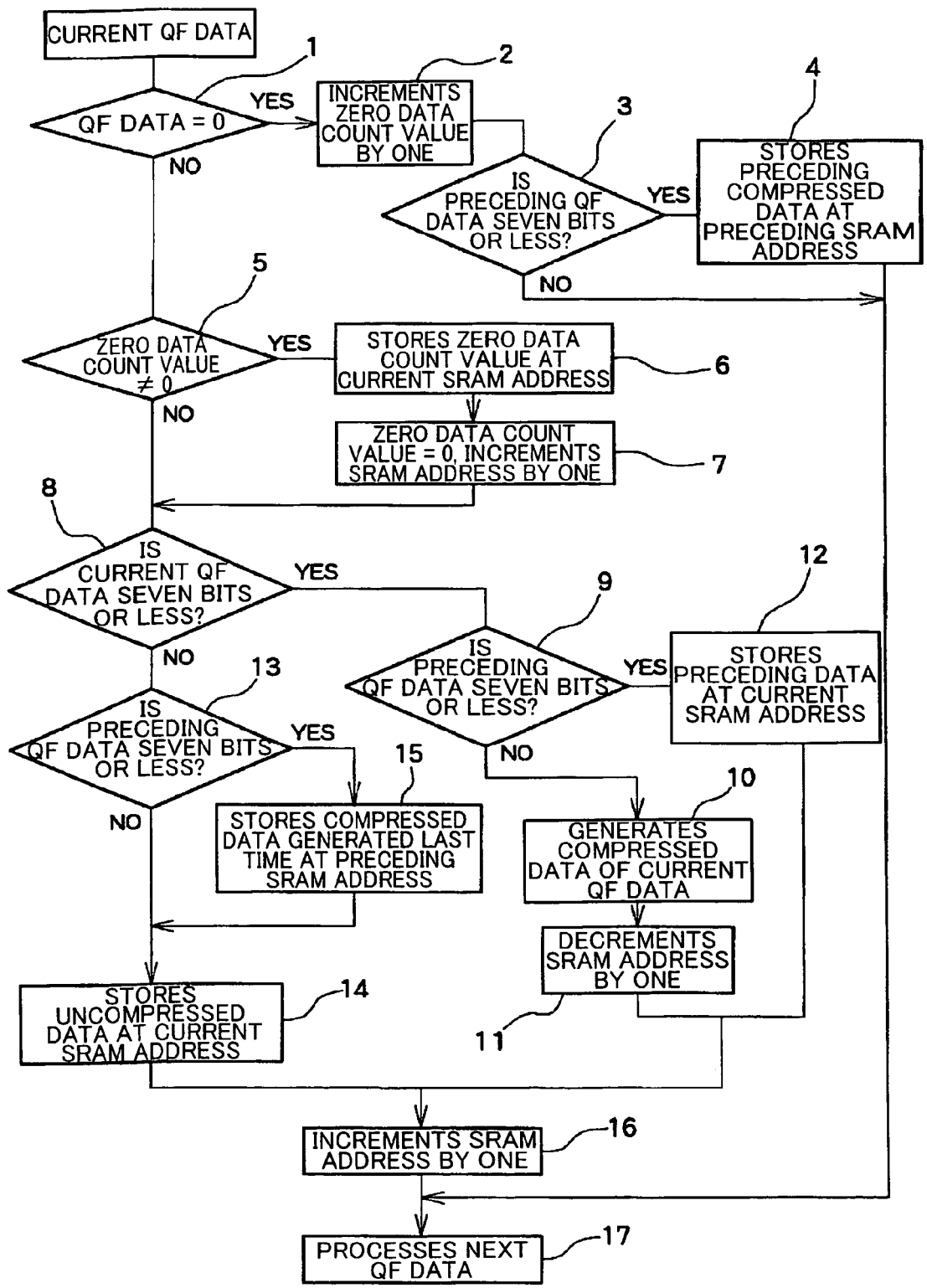
FIG. 12 is a flowchart showing a data compression procedure in a data compression section provided in a software processing section shown in FIG. 7.

FIG. 12 is a flowchart showing the compression processing procedure of the QF data. If the QF data is 0 ("YES" in Step 1), the zero count value is incremented by one (Step 2). If the QF data is the first piece of data, the judgment in Step 3 is "NO", and the next QF data is processed (step 17). Specifically, if the QF data is 0, the zero count value is repeatedly incremented until succession of zero data items ends. Therefore, writing of data into the compressed data storage region 51 (SRAM) is suspended. If the preceding QF data is seven bits or less ("YES" in Step 3), compressed data of seven bits or less generated the last time in Step 10 described later is stored in the storage region at the preceding SRAM address.

If the current QF data is not 0 ("NO" in Step 1), whether or not the zero count value is 0 is judged (Step 5). If the zero count value is not 0 ("YES" in Step 5), the preceding QF data is 0 and succession of zero data items ends in the current processing. Therefore, the zero data count value is stored at the current SRAM address (Step 6). The zero count value is then reset to 0, and the address value is incremented by one (Step 7).

Whether or not the current QF data can be expressed by seven bits or less is judged in Step 8. If "YES" in Step 8, whether or not the preceding QF data can be expressed by seven bits or less is judged (Step 9). If "NO" in Step 9, compressed data (7-bit data) of the current QF data is generated in Step 10. Since the SRAM address is decremented by one in Step 11, the preceding address is maintained even if the address is incremented by one in Step 16. The next QF data is then processed (Step 17). The compressed data generated in this processing is not written. As described above, although the compressed data of seven bits or less is generated in Step 10, the compressed data is not stored before Step 4 or Step 12 or 15 described later.

If "YES" in Step 9, the compressed data generated in Step 10 in the preceding processing is stored in the storage region at the current SRAM address. The SRAM address is then incremented in Step 16, and the next QF data is processed (Step 17).

If "NO" in Step 8, whether or not the preceding QF data is seven bits or less is judged (Step 13). If "NO" in Step 13, the QF data is stored in the storage region at the current SRAM address as uncompressed data (Step 14). If "YES" in Step 13, the compressed data generated the last time in Step 10 is stored at the preceding SRAM address (Step 15). This enables the zero data count value, the 7-bit compressed data, or the uncompressed data shown in FIG. 11 to be stored.

Figure 13:
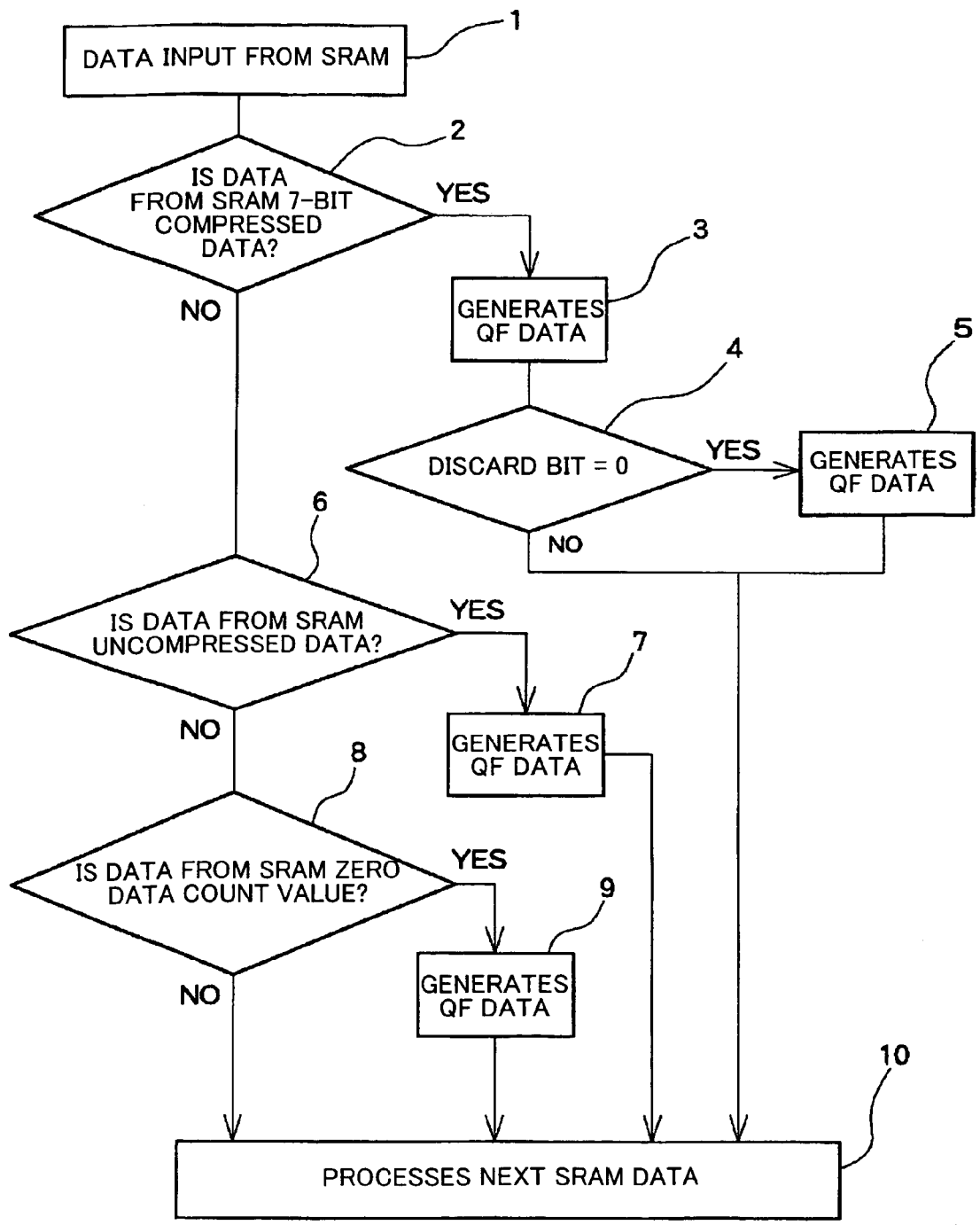
FIG. 13 is a flowchart showing a data decompression procedure in a data decompression section provided in a hardware processing section shown in FIG. 7.

FIG. 13 shows a data decompression operation in the data decompression section 41 provided in the hardware processing section 40 shown in FIG. 7.

Data is captured from the compressed data storage region of the data storage section 50 (SRAM) shown in FIG. 7 (Step 1). Whether or not the data from the SRAM is 7-bit compressed data is judged (Step 2). If "YES" in Step 2, QF data is generated based on the 7-bit compressed data (Step 3). If the discard bit in the packet is 0 ("YES" in Step 4), another piece of effective data exists in the same packet. In this case, QF data is generated based on this effective data (Step 5). If "NO" in Step 4 or the processing in Step 5 has been completed, the next SRAM data is processed (Step 10).

If "NO" in Step 2, whether or not the data from the SRAM is uncompressed data is judged (Step 6). If "YES" in Step 6, QF data is generated based on the uncompressed data (Step 7).

If "NO" in Step 6, whether or not the data from the SRAM is zero data count value is judged (Step 8). If "YES" in Step 8, QF data (=0) of the number corresponding to the zero count value is generated (Step 9). If "NO" in Step 8 or the processing in Step 9 has been completed, the next SRAM data is processed (Step 10).

The processing in Steps 4 to 8 shown in FIG. 2B is performed by the processing sections 42 to 47 in the subsequent stages based on the QF data generated by the data decompression section 41 shown in FIG. 7 and the control data from the SRAM 50, whereby the moving image compressed by using the MPEG-4 method is decoded.

In this embodiment, description of the MPEG encoder which compresses a moving image from the CCD camera 34 shown in FIG. 1 is omitted. In the MPEG encoder, the same effects as those in the above-described embodiment can be obtained by dividing the series of processing into hardware processing and software processing as shown in FIG. 2A, and providing the compressed data storage section between the hardware processing section and the software processing section as a buffer.

The present invention is not limited to the above-described embodiment. Various modifications and variations are possible within the spirit and scope of the present invention. The electronic instrument to which the present invention is applied is not limited to the portable telephone. The present invention may be suitably applied to other electronic instruments, in particular, portable instruments. The moving image compression method is not limited to the MPEG-4 method. The compression method may be another compression method including processing such as variable length coding and quantization.

What is claimed is:

1. A compressed moving image decompression device, comprising:
    a software processing section that decompresses compressed moving image data by software;
    a data storage section that stores the moving image data that has been processed by the software processing section; and
    a hardware processing section that decompresses the moving image data from the data storage section by hardware,
    the software processing section performing decode processing of a variable length code of the compressed moving image data that has been variable-length coded, and the hardware processing section including a plurality of processing sections that perform inverse quantization and subsequent processing of the moving image data that has been decompressed by the software processing section,
    the software processing section including a data compression section that compresses the moving image data to be stored in the data storage section,
    the hardware processing section including a data decompression section that decompresses the moving image data from the data storage section,
    the data compression section counting the number of zero data items continuously arranged on at least one pixel line and compressing the zero data items into a zero data count value,
    the data storage section including a plurality of types of packets, each of the packets storing the moving image data of a given number of bits, and each of the types of the packets being identified by a higher-order bit of the moving image data, and
    the data compression section using the packets depending on whether the packets store compression data or uncompression data.

2. The compressed moving image decompression device as defined in claim 1,
    one of the packets being a zero count data packet, and
    the data compression section storing the zero data count value into the zero count data packet.

3. The compressed moving image decompression device as defined in claim 2,
    another of the packets being a compressed data packet, and
    the data compression section storing a plurality of items of the moving image data into the same compression data packet, each of the items of the moving image data being represented by one or more bits, and the number of bits of the moving image data being equal to or less than a predetermined number.

4. The compressed moving image decompression device as defined in claim 3,
    still another one of the packets being an uncompressed data packet, and
    the data compression section storing the moving image data into the uncompressed data packet, the moving image data being represented by one or more bits, and the number of bits of the moving image data being greater than the predetermined number.

5. The compressed moving image decompression device as defined in claim 1,
    the data storage section including a first storage region that stores the moving image data for at least one frame.

6. The compressed moving image decompression device as defined in claim 5,
    the compressed moving image data that is input to the software processing section being discrete cosine transformed in units of one block that is formed of 8×8 pixels, and
    the first storage region including a plurality of second storage regions, each of the second storage regions storing the plurality of types of packets and storing the moving image data for the one block.

7. The compressed moving image decompression device as defined in claim 6,
    a control data packet that stores control data generated by the software processing section being provided in each of the second storage regions.

8. The compressed moving image decompression device as defined in claim 1,
    the data storage section further including a display storage region that stores the moving image data for at least one frame that has been decompressed by the hardware processing section.

9. The compressed moving image decompression device as defined in claim 1,
    the software processing section performing reverse scan processing after the decode processing of the variable length code.

10. The compressed moving image decompression device as defined in claim 9,
    the software processing section performing inverse AC/DC (alternating current/direct current component) prediction after the reverse scan processing.

11. An image display device, comprising:
    a host CPU;
    a first integrated circuit that is connected with the host CPU and includes a software processing section that decompresses compressed moving image data by software;
    a second integrated circuit that is connected with the host CPU and performs display control; and
    an image display section that is controlled by the second integrated circuit,
    the second integrated circuit including:
    a data storage section that stores the moving image data that has been processed by the software processing section; and
    a hardware processing section that decompresses the moving image data from the data storage section by hardware,
    the software processing section performing decode processing of a variable length code of the compressed moving image data that has been variable-length coded, and the hardware processing section including a plurality of processing sections that perform inverse quantization and subsequent processing of the moving image data that has been decompressed by the software processing section,
    the software processing section including a data compression section that compresses the moving image data to be stored in the data storage section,
    the hardware processing section including a data decompression section that decompresses the moving image data from the data storage section,
    the data compression section counting the number of zero data items continuously arranged on at least one pixel line and compresses the zero data items into a zero data count value, the data storage section including a plurality of types of packets, each of the packets storing the moving image data of a given number of bits, and each of the types of the packets being identified by a higher-order bit of the moving image data, and the data compression section using the packets depending on whether the packets store compression data or uncompression data.

* * * * *